UNITED STATES PATENT OFFICE.

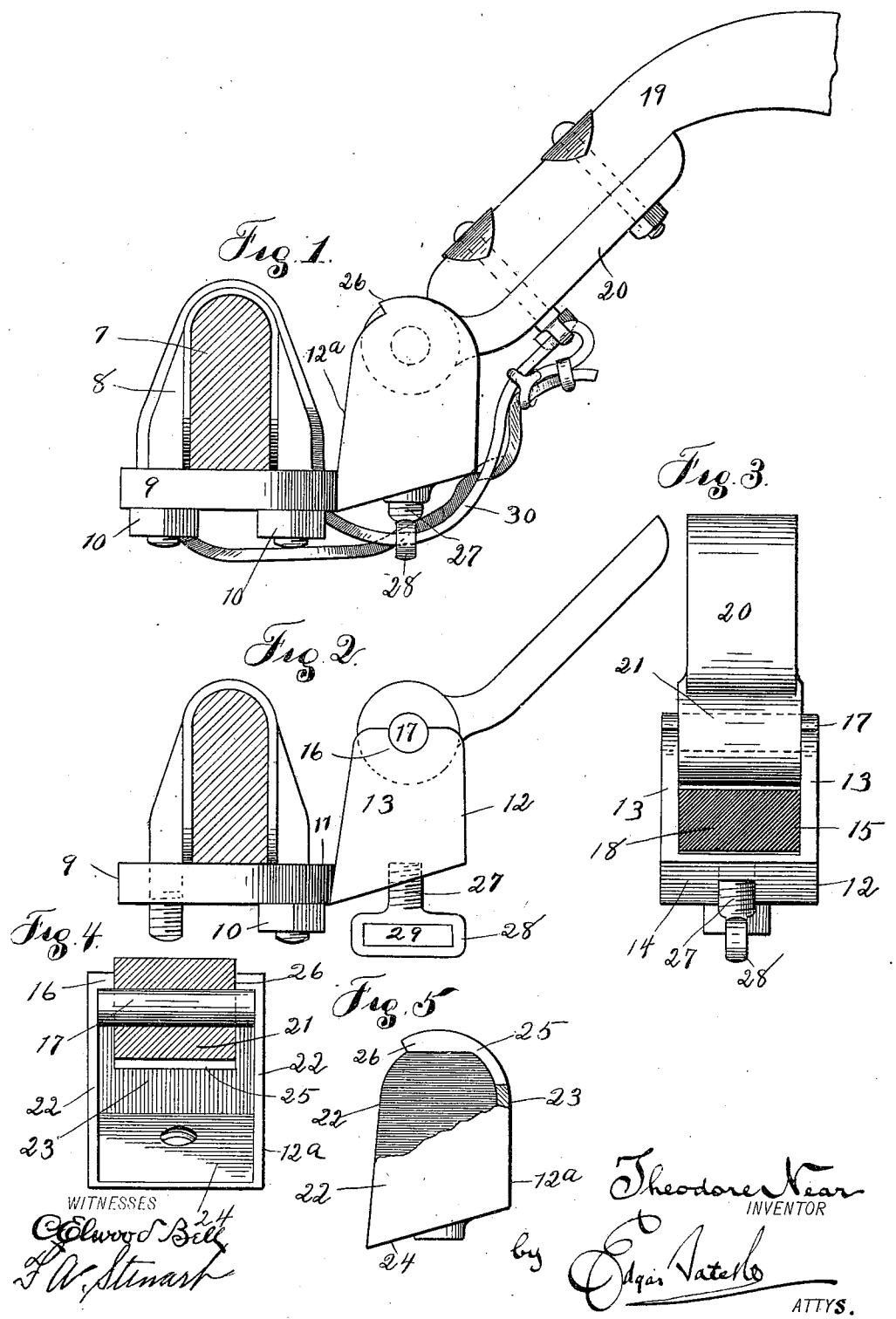

THEODORE NEAR, OF NEW YORK, N. Y.

THILL-COUPLING.

SPECIFICATION forming part of Letters Patent No. 658,859, dated October 2, 1900.

Application filed August 2, 1900. Serial No. 25,627. (No model.)

*To all whom it may concern:*

Be it known that I, THEODORE NEAR, a citizen of the United States, residing at New York, in the county of New York and State of New York, have invented certain new and useful Improvements in Thill-Couplings, of which the following is a full and complete specification, such as will enable those skilled in the art to which it appertains to make and use the same.

This invention relates to thill-couplings; and the object thereof is to provide an improved device of this class which is simple in construction and operation and by means of which the thill or thills of a vehicle may be secured thereto so as to permit of the free action thereof and also to prevent the accidental disconnection of said thill or thills from the vehicle.

The invention is fully disclosed in the following specification, of which the accompanying drawings form a part, in which the separate parts of my improvement are designated by the same reference characters in each of the views, and in which—

Figure 1 is a side view of a thill-coupling made according to my invention, one of the axles of the vehicle being shown in section; Fig. 2, a similar view showing a part of the thill-coupling detached; Fig. 3, a front view of the device as shown in Fig. 2; Fig. 4, a rear view of the detachable part of a coupling, and Fig. 5 a side view thereof with a part broken away.

In the drawings forming part of this specification I have shown at 7 the front axle of a vehicle, and in the practice of my invention I secure thereto a U-shaped clip 8, provided with a base-plate 9, which is secured to said clip by nuts 10, and the base-plate 9 is provided with a forwardly-directed extension 11, with which is integrally connected a supplemental forwardly-directed clip 12, composed of sides 13 and a bottom 14, and the front of which is open, as shown at 15 in Fig. 3. The top of the supplemental clip or part 12 or the sides thereof are extended upwardly and provided with segmental bearings 16, adapted to receive a shaft 17, and in practice a rubber packing 18 is placed in the supplemental clip or portion 12 of the coupling. I have also shown at 19 in Fig. 1 a part of one of the thills of the vehicle, which is connected with a metal shank 20, provided with a head 21, through which the shaft 17 passes, and in Figs. 4 and 5 I have shown the detachable part of the coupling detached therefrom, and in Fig. 1 I have shown it in place, and this detachable part of the coupling consists of a clip 12$^a$, composed of sides 22, a back 23, and bottom 24, and the back and top are cut out to form a rectangular space 25 and inwardly-directed top flanges 26, and the space 25 is designed to receive the head 21 of the shank 20 of the thill 19, which head is shown in section in Fig. 4 and in full lines in Figs. 2 and 3.

The inwardly-directed side flanges at the top of the sides of the detachable clip are shown in Figs. 4 and 5, and the rear side of said clip is open, and in connecting it with the supplemental clip 12 of the stationary part of the coupling the said detachable part is passed backwardly over the supplemental clip 12, as shown in Fig. 1, and completely incloses the same except at the back, and the said top flanges 26 overlap the ends of shaft 17 and securely hold said shaft in the bearings 16, and said detachable part of the coupling is held in place by a screw 27, which is passed upwardly through the bottom thereof and into the bottom of the supplemental stationary clip 12, and said screw is provided at its lower end with an oblong head 28, in which is formed a slot 29, and in order to prevent the displacement or loss of the detachable part of the coupling a belt, strap, or band 30 is passed through the head 28 of the screw 27, and said belt, strap, or band may be connected with the axle and with the shank of the thill in any desired manner, so as to prevent the screw 27 from turning.

By means of this construction I provide a thill-coupling which is simple in construction and operation, also strong and durable, and by means of which the thill or thills cannot be accidentally detached from the vehicles.

Having fully described my invention, I claim as new and desire to secure by Letters Patent—

1. A thill-coupling, comprising a clip adapted to be secured to the axle of the vehicle, and provided with a forwardly-directed supplemental clip formed integrally with the base thereof, said supplemental clip being composed of a bottom and sides, the tops of the sides being provided with shaft-bearings, and a detachable clip composed of sides, a back and a bottom, and the sides of which are provided with top flanges which are adapted to hold a shaft placed in said bearings in position, said detachable clip being adapted to inclose the supplemental clip and to be secured thereto by a screw passed through the bottom thereof, substantially as shown and described.

2. A thill-coupling, comprising a clip adapted to be secured to the axle of the vehicle, and provided with a forwardly-directed supplemental clip formed integrally with the base thereof, said supplemental clip being composed of a bottom and sides, the tops of the sides being provided with shaft-bearings, and a detachable clip composed of sides, a back and a bottom, and the sides of which are provided with top flanges which are adapted to hold a shaft placed in said bearings in position, said detachable clip being adapted to inclose the supplemental clip and to be secured thereto by a screw passed through the bottom thereof, said screw being provided with a slotted head through which is passed a strap or band, substantially as shown and described.

In testimony that I claim the foregoing as my invention I have signed my name, in presence of the subscribing witnesses, this 31st day of July, 1900.

THEODORE NEAR.

Witnesses:
F. A. STEWART,
M. K. LOWERRE.